United States Patent
Samuel et al.

(10) Patent No.: US 11,500,647 B2
(45) Date of Patent: Nov. 15, 2022

(54) SYSTEMS AND METHODS FOR ACHIEVING FASTER BOOT TIMES USING BIOS ATTRIBUTE MITIGATION

(71) Applicant: Dell Products L.P., Round Rock, TX (US)

(72) Inventors: Balasingh P. Samuel, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/087,021

(22) Filed: Nov. 2, 2020

(65) Prior Publication Data

US 2022/0137982 A1 May 5, 2022

(51) Int. Cl.
*G06F 9/44* (2018.01)
*G06F 9/4401* (2018.01)
*G06F 9/445* (2018.01)

(52) U.S. Cl.
CPC .......... *G06F 9/4406* (2013.01); *G06F 9/4411* (2013.01); *G06F 9/44505* (2013.01); *G06F 9/44578* (2013.01)

(58) Field of Classification Search
CPC ..... G06F 1/32; G06F 9/44; G06F 1/12; G06F 21/57
See application file for complete search history.

(56) References Cited

U.S. PATENT DOCUMENTS

| | | | | |
|---|---|---|---|---|
| 2006/0184780 A1* | 8/2006 | Yamada | ................ | G06F 9/4403 713/1 |
| 2007/0022431 A1* | 1/2007 | Chang | ..................... | G06F 9/441 719/321 |
| 2008/0072026 A1* | 3/2008 | Allison | ................. | G06F 9/4418 713/1 |
| 2011/0307711 A1* | 12/2011 | Novak | ................... | G06F 21/575 713/188 |
| 2013/0138938 A1* | 5/2013 | Bang | ...................... | G06F 9/4411 713/2 |
| 2014/0172783 A1* | 6/2014 | Suzuki | ...................... | G06F 8/63 707/609 |
| 2015/0154033 A1* | 6/2015 | Qu | ........................ | G06F 9/4416 713/2 |
| 2021/0406006 A1 | 12/2021 | Hamlin et al. | | |
| 2022/0066538 A1 | 3/2022 | Iyer et al. | | |

* cited by examiner

*Primary Examiner* — Keshab R Pandey
(74) *Attorney, Agent, or Firm* — Jackson Walker L.L.P.

(57) ABSTRACT

A BIOS may include a plurality of BIOS attributes associated with the information handling system, each attribute of the plurality of BIOS attributes having metadata defining a priority for such attribute. The BIOS may also include an attribute engine configured to execute a preboot process prior to booting of an operating system of the information handling system, wherein the preboot process is configured to identify boot-critical attributes of the plurality of BIOS attributes based on the metadata and load the boot-critical attributes. The attribute engine may also execute a steady-state process after booting of the operating system of the information handling system, wherein the steady-state process is configured to load attributes of the plurality of BIOS attributes other than the boot-critical attributes in an order based on the metadata.

12 Claims, 2 Drawing Sheets

SYSTEMS AND METHODS FOR ACHIEVING FASTER BOOT TIMES USING BIOS ATTRIBUTE MITIGATION

TECHNICAL FIELD

The present disclosure relates in general to information handling systems, and more particularly systems and methods for achieving faster boot times with basic input/output system (BIOS) attribute mitigation.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is often desirable for boot times of information handling systems to be as small as possible, for maximum productivity and positive user experience.

SUMMARY

In accordance with the teachings of the present disclosure, the disadvantages and problems associated with boot times of information handling systems may be reduced or eliminated.

In accordance with embodiments of the present disclosure, an information handling system may include a processor and a basic input/output system (BIOS) embodied in non-transitory computer-readable media and configured to be the first code executed by the processor when the information handling system is booted and configured to initialize components of the information handling system into a known state. The BIOS may include a plurality of BIOS attributes associated with the information handling system, each attribute of the plurality of BIOS attributes having metadata defining a priority for such attribute. The BIOS may also include an attribute engine configured to execute a preboot process prior to booting of an operating system of the information handling system, wherein the preboot process is configured to identify boot-critical attributes of the plurality of BIOS attributes based on the metadata and load the boot-critical attributes. The attribute engine may also execute a steady-state process after booting of the operating system of the information handling system, wherein the steady-state process is configured to load attributes of the plurality of BIOS attributes other than the boot-critical attributes in an order based on the metadata.

In accordance with embodiments of the present disclosure, a method, in a basic input/output system (BIOS) embodied in non-transitory computer-readable media and configured to be the first code executed by a processor when an information handling system is booted and configured to initialize components of the information handling system into a known state, may include executing a preboot process prior to booting of an operating system of the information handling system, wherein the preboot process is configured to identify boot-critical attributes of a plurality of BIOS attributes associated with the information handling system based on metadata, wherein each attribute of the plurality of BIOS attributes has metadata defining a priority for such attribute and load the boot-critical attributes. The method may also include executing a steady-state process after booting of the operating system of the information handling system, wherein the steady-state process is configured to load attributes of the plurality of BIOS attributes other than the boot-critical attributes in an order based on the metadata.

In accordance with embodiments of the present disclosure, an article of manufacture may include a non-transitory computer-readable medium and computer-executable instructions carried on the computer-readable medium, the instructions readable by a processing device, the instructions, when read and executed, for causing the processing device to, in a basic input/output system (BIOS) embodied in non-transitory computer-readable media and configured to be the first code executed by a processor when an information handling system is booted and configured to initialize components of the information handling system into a known state execute a preboot process prior to booting of an operating system of the information handling system, wherein the preboot process is configured to identify boot-critical attributes of a plurality of BIOS attributes associated with the information handling system based on metadata, wherein each attribute of the plurality of BIOS attributes has metadata defining a priority for such attribute and load the boot-critical attributes. The instructions may also cause the processor to execute a steady-state process after booting of the operating system of the information handling system, wherein the steady-state process is configured to load attributes of the plurality of BIOS attributes other than the boot-critical attributes in an order based on the metadata.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
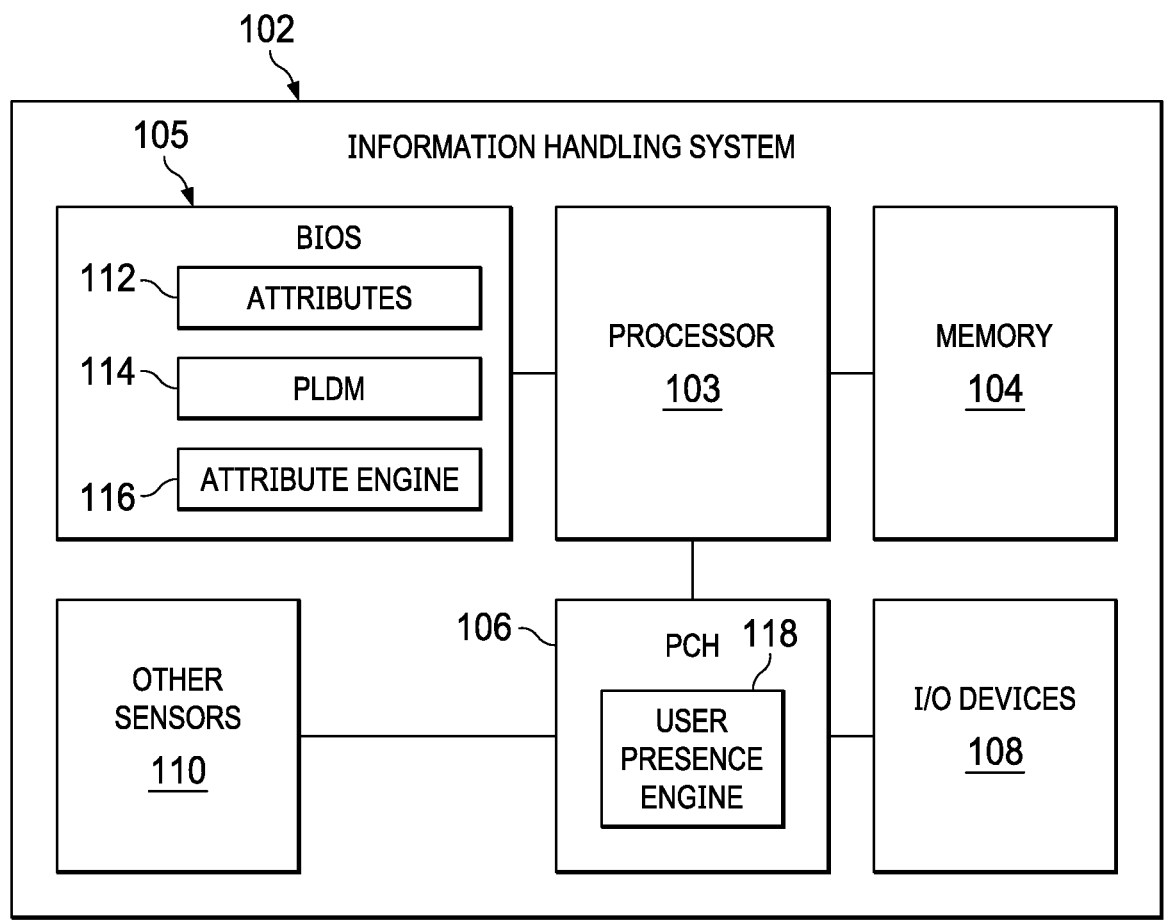
FIG. 1 illustrates a block diagram of an example information handling system, in accordance with certain embodiments of the present disclosure.
Figure 2:
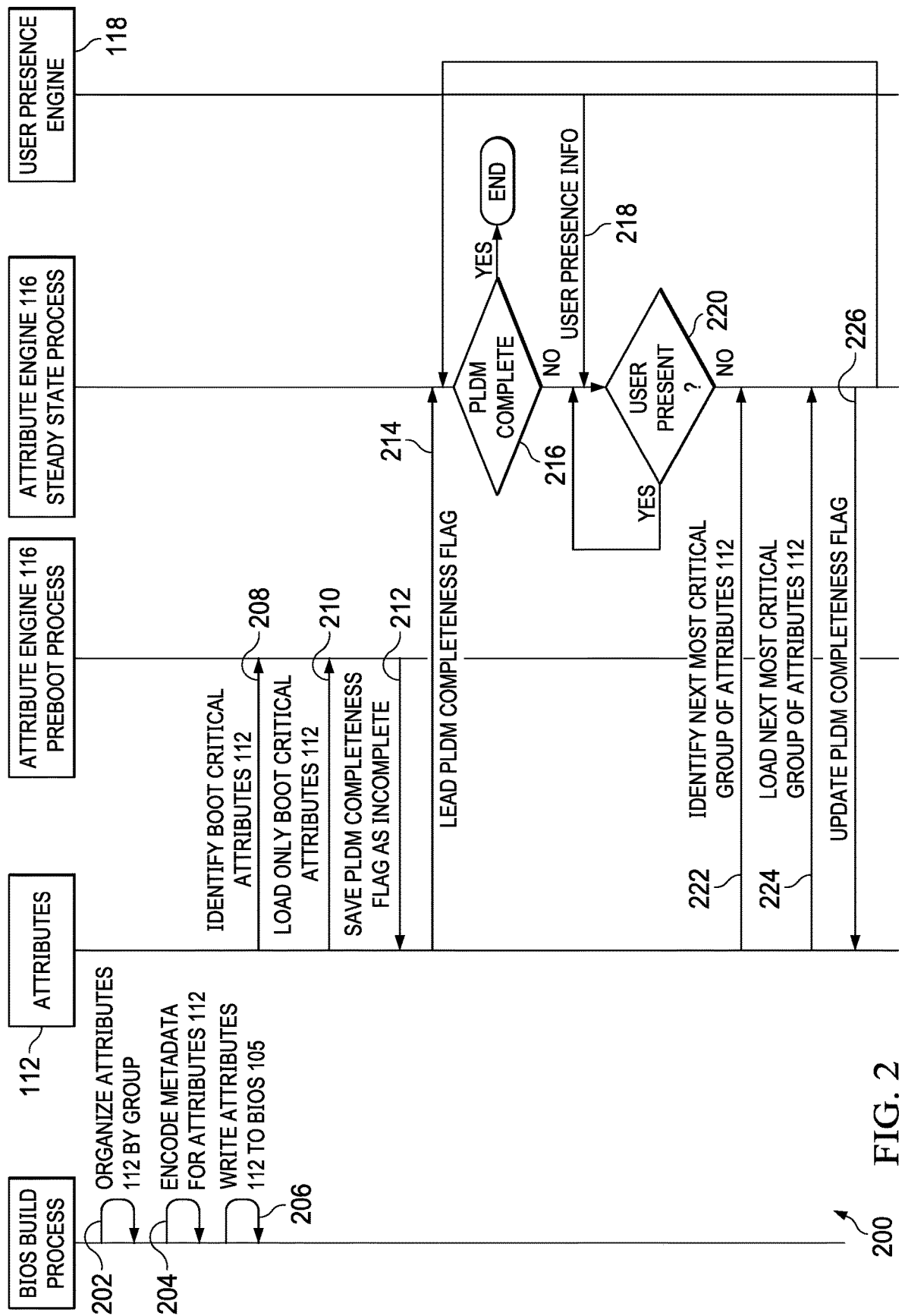
FIG. 2 illustrates a flow chart of an example method for achieving faster boot times with BIOS attribute mitigation, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with certain embodiments of the present disclosure. In some embodiments, information handling system 102 may be a personal computer. In particular embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a platform controller hub (PCH) 106 communicatively coupled to processor 103, input/output devices 108 communicatively coupled to processor 103 via PCH 106, and one or more other sensors 110 communicatively coupled to processor 103 via PCH 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may include any system, device, or apparatus configured to retain data (including program instructions) for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 105 may maintain BIOS attributes 112 and platform level data model (PLDM) 114 for firmware, and may implement attribute engine 116. Attributes 112 may provide an administrator of information handling system 102 control points to manage and configure end-point devices. PLDM 114 may be created by BIOS 105 based on attributes 112. Traditionally, BIOSes create PLDM during a preboot phase of an information handling system by parsing all BIOS attributes at once, which adds significantly to boot time. However, in accordance with embodiments of the present disclosure, attributes 112 may include priority metadata that sets forth a priority for each attribute 112. Further, attribute engine 116 may comprise a program of executable instructions configured to, as described in greater detail below, load only boot-critical attributes 112 during the preboot phase of information handling system 102, and load other attributes based on attribute priorities during steady state operation of information handling system 102 after boot to an operating system of information handing system 102.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. For example, one such function may include implementing a management engine. A management engine may comprise hardware and/or firmware that enables remote out-of-band management for information handling system 102 in order to monitor, maintain, update, upgrade, and/or repair information handling system 102. As shown in FIG. 1, PCH 106 may implement a user presence engine 118. User presence engine 118 may comprise any suitable system, device, or apparatus configured to, based on input signals received from I/O devices 108 and other sensors 110, determine whether a user is present and/or aware at information handling system 102. Example implementations of user presence and awareness detection are described in U.S. patent application Ser. No. 16/910,710 filed Jun. 24, 2020 and U.S. patent application Ser. No. 17/009,232 filed Sep. 1, 2020, both of which are incorporated by reference herein in their entireties.

Each of one or more input/output (I/O) devices 108 may comprise any system, device, or apparatus configured to generate output to a user or another component and/or configured to receive input from a user or another component. Examples of I/O devices 108 may include a display, a keyboard, a mouse, an interactive touch screen, a camera, and/or associated controllers.

Each of one or more other sensors 110 may include any system, device, or apparatus configured to sense one or more physical quantities, and generate one or more signals indicative of such one or more physical quantities. An example of a sensor 110 may include a temperature sensor, an ambient light sensor, a proximity sensor, a motion sensor, a camera, and any other suitable sensor.

In addition to processor 103, memory 104, PCH 106, I/O devices 108, and other sensors 110, information handling system 102 may include one or more other information handling resources.

FIG. 2 illustrates a flow chart of an example method 200 for achieving faster boot times with BIOS attribute mitigation, in accordance with certain embodiments of the present disclosure. According to one embodiment, method 200 may begin at step 202. As noted above, teachings of the present disclosure may be implemented in a variety of configurations of information system 102. As such, the preferred initialization point for method 200 and the order of the steps comprising method 200 may depend on the implementation chosen.

At step 202, a BIOS build process may organize attributes 112 by group (e.g., boot critical group, networking group, etc.). At step 204, based on these groups, the BIOS build process may encode priority metadata into attributes 112. At step 206, the BIOS build process may write attributes 112 to BIOS 105.

At step 208, a preboot process of attribute engine 116 may identify boot critical attributes 112. At step 210, the preboot process may load only those attributes 112 identified as boot critical. At step 212, the preboot process may save a PLDM completeness flag as incomplete. After step 212, BIOS 105 may cause information handling system 102 to boot (e.g., to its operating system).

At step 214, after the operating system has loaded, a steady state process of attribute engine 116 may load the PLDM completeness flag. At step 216, the steady state process may determine if the PLDM completeness flag indicates that PLDM 114 is complete (e.g., all attributes 112 have been read and processed by BIOS 105). If PLDM 114 is complete, method 200 may proceed to step 218. Otherwise, method 200 may end.

At step 218, the steady state process may receive user presence information from user presence engine 118. At step 220, the steady state process may determine if a user is present based on the user presence information. If the user is absent, method 200 may proceed to step 222. Otherwise, if the user is present, method 200 may loop through steps 218 and step 220 until the user is absent.

At step 222, the steady state process may identify based on metadata of attributes 112 which group of remaining attributes 112 is of highest priority. At step 224, the steady state process may load such group of remaining attributes.

At step 226, the steady state process may update the PLDM completeness flag based on whether all attributes 112 have been loaded. If all attributes 112 have been loaded, the steady state process may set the PLDM completeness flag to "TRUE." After completion of step 226, method 200 may proceed again to step 216.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although step 220 of method 200 indicates that presence or absence of user presence is a trigger for loading additional BIOS attributes 112 by the steady state process of attribute engine 116, in some embodiments, one or more other factors may be used such as a trigger in lieu of or in addition to user presence. For example, in some embodiments, a processing load of processor 103 may be used as such a trigger, with a low processing load triggering the loading of additional BIOS attributes.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system (BIOS) embodied in non-transitory computer-readable media and configured to be the first code executed by the processor when the information handling system is booted and configured to initialize components of the information handling system into a known state, the BIOS comprising:
      a plurality of BIOS attributes associated with the information handling system, each attribute of the plurality of BIOS attributes having metadata defining a priority for such attribute; and
      an attribute engine configured to:
         execute a preboot process prior to booting of an operating system of the information handling system, wherein the preboot process is configured to:
            identify boot-critical attributes of the plurality of BIOS attributes based on the metadata;
            load the boot-critical attributes; and
            save a platform level data model (PLDM) completeness flag as incomplete; and
         execute a steady-state process after booting of the operating system of the information handling system, wherein the steady-state process is configured to:
            access the PLDM completeness flag;
            responsive to determining that the PLDM completeness flag indicates incomplete, load attributes of the plurality of BIOS attributes other than the boot-critical attributes in an order based on the metadata; and
            update the PLDM completeness flag.

2. The information handling system of claim 1, wherein the steady-state process is further configured to:
   determine if one or more conditions exist for loading additional attributes of the plurality of BIOS attributes; and
   responsive to the one or more conditions existing, load additional attributes of the plurality of BIOS attributes based on the metadata.

3. The information handling system of claim 2, wherein the one or more conditions comprise whether all of the plurality of attributes have been loaded.

4. The information handling system of claim 2, wherein the one or more conditions comprise whether a user is present or absent at the information handling system.

5. A method comprising, in a basic input/output system (BIOS) embodied in non-transitory computer-readable media and configured to be the first code executed by a processor when an information handling system is booted and configured to initialize components of the information handling system into a known state:
   executing a preboot process prior to booting of an operating system of the information handling system, wherein the preboot process is configured to:
      identify boot-critical attributes of a plurality of BIOS attributes associated with the information handling system based on metadata, wherein each attribute of the plurality of BIOS attributes has metadata defining a priority for such attribute;
      load the boot-critical attributes; and
      save a platform level data model (PLDM) completeness flag as incomplete; and
   executing a steady-state process after booting of the operating system of the information handling system, wherein the steady-state process is configured to:
      access the PLDM completeness flag;
      responsive to determining that the PLDM completeness flag indicates incomplete, load attributes of the plurality of BIOS attributes other than the boot-critical attributes in an order based on the metadata; and
      update the PLDM completeness flag.

6. The method of claim 5, wherein the steady-state process is further configured to:
   determine if one or more conditions exist for loading additional attributes of the plurality of BIOS attributes; and
   responsive to the one or more conditions existing, load additional attributes of the plurality of BIOS attributes based on the metadata.

7. The method of claim 6, wherein the one or more conditions comprise whether all of the plurality of attributes have been loaded.

8. The method of claim 6, wherein the one or more conditions comprise whether a user is present or absent at the information handling system.

9. An article of manufacture comprising:
   a non-transitory computer-readable medium; and
   computer-executable instructions carried on the computer-readable medium, the instructions readable by a processing device, the instructions, when read and executed, for causing the processing device to, in a basic input/output system (BIOS) embodied in non-transitory computer-readable media and configured to be the first code executed by a processor when an information handling system is booted and configured to initialize components of the information handling system into a known state:

execute a preboot process prior to booting of an operating system of the information handling system, wherein the preboot process is configured to:
  identify boot-critical attributes of a plurality of BIOS attributes associated with the information handling system based on metadata, wherein each attribute of the plurality of BIOS attributes has metadata defining a priority for such attribute;
  load the boot-critical attributes; and
  save a platform level data model (PLDM) completeness flag as incomplete; and
execute a steady-state process after booting of the operating system of the information handling system, wherein the steady-state process is configured to:
  access the PLDM completeness flag;
  responsive to determining that the PLDM completeness flag indicates incomplete, load attributes of the plurality of BIOS attributes other than the boot-critical attributes in an order based on the metadata; and
  update the PLDM completeness flag.

10. The article of claim 9, wherein the steady-state process is further configured to:
  determine if one or more conditions exist for loading additional attributes of the plurality of BIOS attributes; and
  responsive to the one or more conditions existing, load additional attributes of the plurality of BIOS attributes based on the metadata.

11. The article of claim 10, wherein the one or more conditions comprise whether all of the plurality of attributes have been loaded.

12. The article of claim 10, wherein the one or more conditions comprise whether a user is present or absent at the information handling system.

* * * * *